US010283806B1

(12) United States Patent
Lee

(10) Patent No.: US 10,283,806 B1
(45) Date of Patent: May 7, 2019

(54) MANUFACTURING METHOD FOR LAMINATED SECONDARY BATTERY

(71) Applicant: Sora Lee, Seongnam-si, Gyeonggi (KR)

(72) Inventor: Jun Chul Lee, Seongnam-si (KR)

(73) Assignee: Sora Lee, Seongnam-si (KR)

( * ) Notice: Subject to any disclaimer, the term of this patent is extended or adjusted under 35 U.S.C. 154(b) by 0 days.

(21) Appl. No.: 16/017,704

(22) Filed: Jun. 25, 2018

(30) Foreign Application Priority Data

Nov. 15, 2017 (KR) .................. 10-2017-0152076

(51) Int. Cl.
*H01M 10/00* (2006.01)
*H01M 10/04* (2006.01)
*H01M 2/16* (2006.01)

(52) U.S. Cl.
CPC ..... *H01M 10/0459* (2013.01); *H01M 2/1673* (2013.01); *H01M 10/045* (2013.01); *H01M 10/049* (2013.01)

(58) Field of Classification Search
CPC ........... H01M 10/425; H01M 10/0525; H01M 2010/4271; H01M 2/204; H01M 4/0404; H01M 10/0585
See application file for complete search history.

(56) References Cited

U.S. PATENT DOCUMENTS

| 2007/0218355 A1 | 9/2007 | Ryu et al. |
| 2014/0363727 A1 | 12/2014 | Ko et al. |
| 2018/0123177 A1* | 5/2018 | Wang .................. H01M 2/204 |

FOREIGN PATENT DOCUMENTS

| JP | 2009-530766 A | 8/2009 |
| JP | 2010-53245 A | 3/2010 |
| KR | 10-0515571 B1 | 9/2005 |

(Continued)

*Primary Examiner* — Cynthia H Kelly
*Assistant Examiner* — Monique M Wills
(74) *Attorney, Agent, or Firm* — Novick, Kim & Lee, PLLC; Sang Ho Lee

(57) ABSTRACT

Provided is a method of manufacturing a laminated secondary battery in which in the battery cell laminate in which the electrode cells are laminated, one full cell manufactured by the heat fusion process is laminated, and each unit electrode cell is laminated between each of the full cells to form one electrode assembly, thereby simplifying a manufacturing process, minimizing reworking due to defective electrode cells and minimizing an initial investment cost. To this end, provided is a method of manufacturing a laminated secondary battery having a structure in which two or more unit cells (a), an electrode cell (b), and an electrode cell (c) are cross stacked, including: 1) preparing a unit full cell, wherein the unit cell (a) is composed of a separation membrane/a cathode cell/a separation membrane/a anode cell/a separation membrane; 2) preparing an anode unit cell by the electrode cell (b) and a cathode unit cell by the electrode cell (c); and 3) sequentially laminating the unit cell (a), the electrode cell (b), the flipped-over unit cell (a'), and the electrode cell (c), wherein the laminated uppermost electrode has a structure in which electrodes having the same polarity as the lowermost polarity of the unit cell (a) are laminated, and wherein the laminate completed with the lamination is wrapped with the outer film, and the film end portion is fixed by the tape or the heat fusion.

1 Claim, 2 Drawing Sheets

(56) References Cited

FOREIGN PATENT DOCUMENTS

| | | |
|---|---|---|
| KR | 10-2011-0112241 A | 10/2011 |
| KR | 10-1480740 B1 | 1/2015 |
| KR | 10-1510518 B1 | 4/2015 |
| KR | 10-2016-0036799 A | 4/2016 |
| KR | 10-1609424 B1 | 4/2016 |
| KR | 10-2016-0067059 A | 6/2016 |
| KR | 10-1729818 B1 | 5/2017 |
| KR | 10-2017-0075482 A | 7/2017 |
| KR | 10-1795830 B1 | 12/2017 |

\* cited by examiner

MANUFACTURING METHOD FOR LAMINATED SECONDARY BATTERY

CROSS-REFERENCE TO RELATED APPLICATIONS

This application claim priority under 35 USC § 119 to Korean patent application No. 10-2017-0152076 filed on Nov. 15, 2017, the entire disclosure of which is hereby incorporated by reference.

TECHNICAL FIELD

The present disclosure relates to a method of manufacturing a secondary battery, and more particularly, to a method of manufacturing a laminated secondary battery in which two or more unit cells are laminated.

BACKGROUND

In recent years, rechargeable secondary batteries have been widely used as energy sources for wireless mobile devices. In addition, the secondary battery is gaining attention as a power source of an electric vehicle (EV), a hybrid electric vehicle (HEV), a plug-in hybrid electric vehicle (Plug-In HEV), and the like, which are proposed as solutions for solving the air pollution of existing gasoline vehicles and diesel vehicles using fossil fuels.

Such a secondary battery is roughly classified into a cylindrical battery, a prismatic battery and a pouch-shaped battery according to the external and internal structural characteristics. Among them, a prismatic battery and a pouch-shaped battery which can be laminated with a high degree of integration and have a width smaller than the length have attracted particular attention.

The electrode assembly of the anode/separation membrane/cathode structure constituting the secondary battery is largely divided into a jelly-roll type (wound type) and a stacked type (laminated type) depending on its structure. In the jelly-roll type electrode assembly, an electrode active material or the like is coated on a metal foil used as a current collector, dried and pressed, cut into a band shape having a desired width and length, and a cathode and an anode are separated by means of a membrane using a separation membrane and are spirally wound to manufacture the same. Although such a jelly-roll type electrode assembly can be preferably used for a cylindrical battery, when applied to a prismatic or pouch-type battery, there is a problem that local stress is concentrated and the electrode active material is peeled off or the battery is deformed due to repeated shrinkage and expansion phenomenon during charge/discharge processes.

On the other hand, the stacked electrode assembly has a structure in which a plurality of anode and cathode unit cells are sequentially laminated, and there is an advantage in that it is easy to obtain a prismatic shape. However, there is a disadvantage in that a manufacturing process is cumbersome and the electrode is pushed when the impact is applied, causing a short circuit.

In order to solve such a problem, some prior art has developed an electrode assembly of advanced structure which is a mixed type of the jelly-roll type and the stacked type, wherein a full cell of an anode/a separation membrane/ an cathode structure of a certain unit size or a bicell of an anode(cathode)/a separation membrane/a cathode(anode)/ separation membrane/anode(cathode) structure was used to develop a stack/folding type electrode assembly of a structure folded by using a long length continuous separation film.

However, it is necessary to arrange the unit cells in a long sheet-like separation membrane one by one, and an internal space or a system for a manufacturing process such as holding and folding the unit cells and the separation membrane at both ends is indispensably required. The processing is very complicated, and the equipment investment cost is high as a result. Furthermore, as the unit cells increase, the unit cells are arranged in a line and are difficult to be wound, resulting in a problem that the defective rate of the electrode assembly may increase.

SUMMARY

The present disclosure is designed to overcome the above-described problems of the prior art. It is an object of the present disclosure to provide a method of manufacturing a laminated secondary battery in which in the battery cell laminate in which the electrode cells are laminated, one full cell manufactured by the heat fusion process is laminated, and each unit electrode cell is laminated between each of the full cells to form one electrode assembly, thereby simplifying a manufacturing process, minimizing reworking due to defective electrode cells and minimizing an initial investment cost.

The problems to be solved by the present disclosure are not limited to the above-mentioned problems, and other problems not mentioned can be clearly understood by those skilled in the art from the following descriptions.

In order to achieve the above object, a method of manufacturing a laminated secondary battery according to the present disclosure having a structure in which two or more unit cells (a), an electrode cell (b), and an electrode cell (c) are cross stacked, comprising: 1) preparing a unit full cell, wherein the unit cell (a) is composed of a separation membrane/a cathode cell/a separation membrane/a anode cell/a separation membrane; 2) preparing an anode unit cell by the electrode cell (b) and a cathode unit cell by the electrode cell (c); and 3) sequentially laminating the unit cell (a), the electrode cell (b), the flipped-over unit cell (a'), and the electrode cell (c), wherein the laminated uppermost electrode has a structure in which electrodes having the same polarity as the lowermost polarity of the unit cell (a) are laminated, and wherein the laminate completed with the stacking is wrapped with the outer film, and the film end portion is fixed by the tape or the heat fusion.

In addition, the unit cell (a) has a structure of a unit full cell formed of a separation membrane/a cathode cell/a separation membrane/an anode cell/a separation membrane. The cathode cell is an electrode having a polarity of a cathode and is coated with a cathode material on both sides of the cathode current collector. The anode cell is an electrode having a polarity of an anode and is coated with an anode material on both sides of the anode current collector. The separation membrane and the electrodes form one unit cell (a) through step heat fusion.

In addition, the electrode cell (b) is an electrode having a cathode polarity and may be an electrochemical device having an anode material coated on both surfaces of the cathode current collector.

In addition, the electrode cell (b) is an electrode having an anode polarity and may be an electrochemical device having an anode material coated on both surfaces of the anode current collector In addition, it may include a structure in which the electrode cell (b) is additionally stacked according to the number of laminated electrodes, a separation membrane is added to constitute an electrode having the same polarity as the lowest end polarity, and a separation membrane is added to the outermost side.

In addition, it is preferable that the separation membrane is not constituted at the uppermost and lowermost portions of the laminate in which the loading is completed, but is packed and wrapped only in the separations film.

Other specific details of the present disclosure are included in the detailed description and the drawings.

According to the method of manufacturing a laminated secondary battery according to the present disclosure constituted as above, the process of preparing the unit cell and the electrode cell is relatively simple by adopting a method of solving the conventional problem and replacing and stacking the unit cell and the electrode cell, and the frequency of reworking can be significantly reduced by eliminating electrode defective products in the corresponding preparation process of the unit cell and the electrode cell.

In addition, by adopting a method of laminating the unit cells and the electrode cells in parallel, it also produces an effect of reducing an initial investment cost of facilities for preparing the unit cells and the electrode cells.

The effects of the present disclosure are not limited to the effects mentioned above, and other effects not mentioned may be clearly understood by those skilled in the art from the following descriptions.

DETAILED DESCRIPTION

Figure 1:
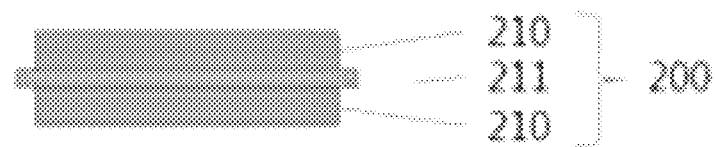
FIG. 1 is a mimetic diagram illustrating a double-coated cathode (electrode cell (b)) produced by the method of manufacturing a laminated secondary battery according to the present disclosure.

The advantages and features of the present disclosure and the method of achieving the same will become apparent with reference to the embodiments described in detail below with reference to the accompanying drawings. The present disclosure may, however, be embodied in many different forms and should not be construed as being limited to the embodiments set forth herein; rather, these embodiments are provided so that this disclosure will be thorough and complete, and are provided to fully convey the category of the present disclosure to those skilled in the technical field to which the present disclosure pertains. The present disclosure is only defined by the scope of the claims.

The terminology used herein is for the purpose of illustrating embodiments and is not intended to be limiting of the present disclosure. In this specification, singular forms include plural forms unless the context clearly dictates otherwise. The term "comprises" and/or "comprising" used herein does not exclude the presence or addition of one or more other constituents in addition to the stated constituent. The same reference numerals refer to the same reference numerals throughout the specification, and "and/or" include each and every combination of one or more of the constituents mentioned. Although "first" and "second" and the like are used to describe various constituents, it is needless to say that these constituents are not limited by these terms. These terms are only used to distinguish one constituent from another constituent. Therefore, it goes without saying that the first constituent mentioned below may be the second constituent within the technical ideas of the present disclosure.

Unless defined otherwise, all terms (including technical and scientific terms) used herein may be used in a sense that is commonly understood by one of ordinary skill in the technical field to which the present disclosure pertains. In addition, the terms that are commonly used and defined in the dictionary are not ideally or excessively interpreted unless explicitly defined otherwise.

The spatially relative terms, "below", "beneath", "lower", "above" and "upper," are used to easily describe a correlation between one constituent and the other constituents as illustrated in the drawings. Spatially relative terms should be understood as a term including directions that are different from one another of the constituents at the time of use or operation in addition to the directions illustrated in the drawings. For example, when inverting a constituent illustrated in the drawings, the constituent described as "below" or "beneath" of another constituent may be placed "above" another constituent. Accordingly, the exemplary term "below" can include both downward and upward directions. The constituents can also be oriented in different directions, and accordingly, spatially relative terms can be interpreted according to orientation.

Hereinafter, preferred embodiments of the present disclosure will be described in detail with reference to the accompanying drawings.

Figure 2:
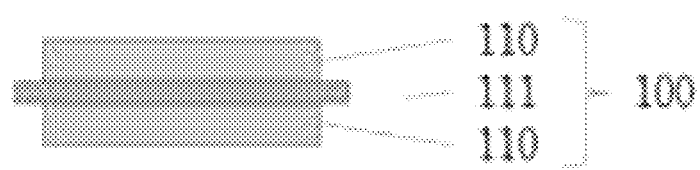
FIG. 2 is a mimetic diagram illustrating a double-sided coated anode (electrode cell (c)) produced by the method of manufacturing a laminated secondary battery according to the present disclosure.
Figure 3:
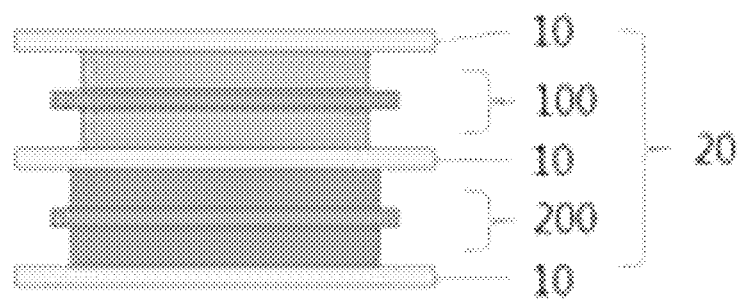
FIG. 3 is a mimetic diagram illustrating a layered structure (unit cell (a)) of one full cell composed of a separation membrane/cathode cells/a separation membrane/anode cells/a separation membrane.
Figure 4:
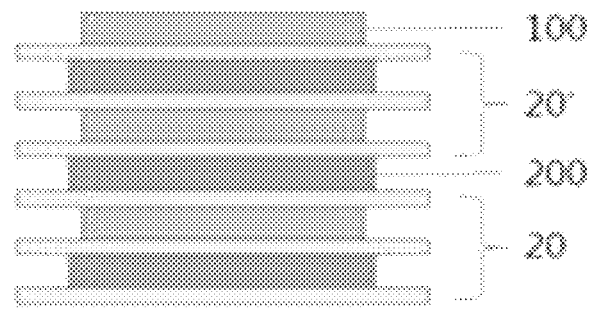
FIG. 4 is a mimetic diagram of a laminated portion in which a unit cell (a), an electrode cell (b), and an electrode cell (c) are sequentially stacked.
Figure 5:
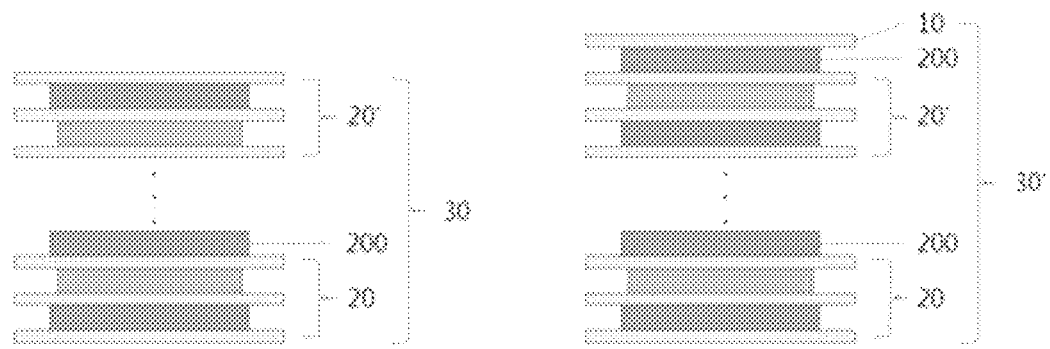
FIG. 5 is a mimetic diagram of a laminated portion completed by laminating the uppermost polarity with the lowest polarity as the same polarity by the method of manufacturing a laminated secondary battery according to the present disclosure.
Figure 6:
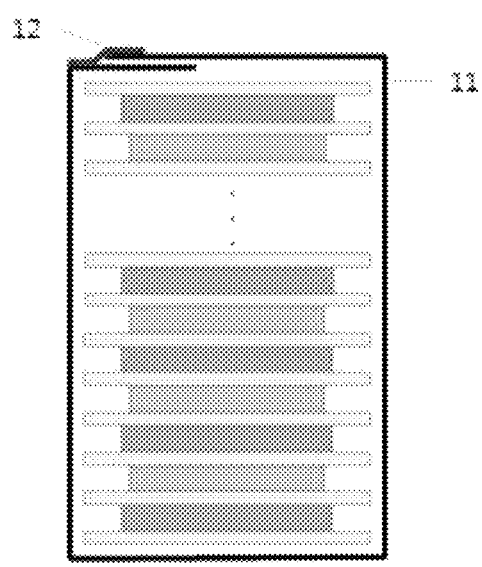
FIG. 6 is a mimetic diagram illustrating a method of wrapping a laminated cell and another laminated cell by a separation film according to another embodiment of the method for manufacturing a laminated secondary battery according to the present disclosure.

FIG. 1 is a mimetic diagram illustrating a double-coated cathode (electrode cell (b)) produced by the method of manufacturing a laminated secondary battery according to the present disclosure, FIG. 2 is a mimetic diagram illustrating a double-sided coated anode (electrode cell (c)) produced by the method of manufacturing a laminated secondary battery according to the present disclosure, FIG. 3 is a mimetic diagram illustrating a layered structure (unit cell (a)) of one full cell composed of a separation membrane/cathode cells/a separation membrane/anode cells/a separation membrane, FIG. 4 is a mimetic diagram of a laminated portion in which a unit cell (a), an electrode cell (b), and an electrode cell (c) are sequentially stacked, FIG. 5 is a mimetic diagram of a laminated portion completed by laminating the uppermost polarity with the lowest polarity as the same polarity by the method of manufacturing a laminated secondary battery according to the present disclosure, and FIG. 6 is a mimetic diagram illustrating a method of wrapping a laminated cell and another laminated cell by a separation film according to another embodiment of the method for manufacturing a laminated secondary battery according to the present disclosure.

As described above, the conventional jelly roll type electrode manufacturing method is simpler than other manufacturing methods, but there still exists a problem of electrode crack and volume change due to electrode folding.

In addition, the electrode assembly in which a plurality of individual electrode cells are laminated in the Z shape have limitations in the improvement of assembly speed, and there is a problem in the positional precision of each electrode cell laminated in the laminating method of electrode insertion type on the side. Also, the stack and the folding type electrode assembly can solve the problem of the jelly roll type, but there is a problem in that the manufacturing method is very complicated.

In order to solve such a manufacturing problem, with an integration method by tape fixing and heat fusion wherein a unit cell and an electrode cell are laminated, an outermost layer is wrapped with a separation film, the inventors aims at solving the problem of positional precision of the Z stack method of laminating multiple layers of electrodes and simplifying the complicated manufacturing method of stacking and folding.

To this end, as illustrated herein, the present disclosure provides a method of manufacturing a laminated secondary battery having a structure in which two or more unit cells (a)(20), an electrode cell (b)(100), and an electrode cell (c)(200) are cross stacked, comprising: 1) preparing a unit full cell, wherein the unit cell (a)(20) is composed of a separation membrane (10)/a cathode cell (200)/a separation membrane (10)/a anode cell (100)/a separation membrane (10); 2) preparing an anode unit cell by the electrode cell (b)(100) and a cathode unit cell by the electrode cell (c)(200); and 3) sequentially laminating the unit cell (a)(20), the electrode cell (b)(100), the flipped-over unit cell (a')(20'), and the electrode cell (c)(200).

Herein, the laminated uppermost electrode has a structure in which electrodes having the same polarity as the lowermost polarity of the unit cell (a)(20) are laminated. The laminate completed with the stacking is wrapped with the outer film (11), and the film end portion is fixed by the tape (12) or the heat fusion.

In this case, the unit cell (a)(20) has a structure of a unit full cell formed of a separation membrane (10)/a cathode cell (200)/a separation membrane (10)/an anode cell (100)/a separation membrane (10). The cathode cell (200) is an electrode having a polarity of a cathode and is coated with a cathode material (210) on both sides of the cathode current collector (211). The anode cell (100) is an electrode having a polarity of an anode and is coated with an anode material (110) on both sides of the anode current collector (111). The separation membrane (10) and the electrodes form one unit cell (a) through step heat fusion.

In addition, the electrode cell (b)(100) may be formed of an electrochemical device having a cathode material (210) coated on both surfaces of a cathode current collector (211) as an electrode having a polarity of a cathode.

In addition, the electrode cell (b) may be formed of an electrochemical device having an anode material (110) coated on both surfaces of an anode current collector (111) as an electrode having a polarity of an anode.

In addition, depending on the number of laminated electrodes, the electrode cell (b)(100) is additionally laminated and a separation membrane (10) is added to constitute an electrode having the same polarity as the lowermost polarity and a separation membrane (10) is added to the outermost side.

More specifically, FIGS. 1 and 2 are mimetic diagrams of each of the unit electrode cells, and each electrode cell is coated with an electrode material on both sides with an electrode current collector interposed therebetween to complete one electrode cell.

FIG. 3 is a mimetic diagram illustrating that the electrode cell (200) completed in FIGS. 1 and 2 and the other electrode cells (100) are laminated in the order of the separation membrane (10)/the electrode cell (200)/the separation membrane (10)/the electrode cell (100)/the lamination membrane (10), and completing one unit cell (20) through heat fusion.

Referring to FIG. 4, the unit cell (20)/the electrode cell (200)/the unit cell (20') whose upper and lower surfaces are switched/the electrode cell (100) may be sequentially laminated to sequentially laminate a cathode/an anode.

Referring to FIG. 5, depending on the number of laminated electrodes, the polarity of the anode or the cathode may be located at the uppermost position. If the uppermost polarity is the anode, the electrode cell (200) may be added to form a laminated cell (30') whose lowermost and the uppermost polarities have the same form. The formed laminated cells are integrated through heat fusion.

Referring to FIG. 6, the laminated cell (30) and another laminated cell (30') are wrapped by the separation film (11), and the end portion thereof is fixed by the tape (12) and maintained in a fixed state by heat shrinkage, so that the external insulation between the laminated cells (30)(30') can be maintained by using insulation materials.

When constructing a laminator (cutter) by the process of the present disclosure, one type of full-cell laminator and two types of electrode cutting equipment are required.

If the full cells are arranged at the uppermost and lowermost positions in the arrangement order, a separation membrane is not needed. However, if (positive or negative) electrodes are disposed at the uppermost and lowermost positions, there is no separation membrane on the upper and lower sides. Therefore, a separate separation membrane cutting equipment is required to laminate a separate separation membrane, and thus additional equipment is required.

However, since the cells are generally wrapped with a separation membrane after cell lamination, there is no need for separate membrane cutting and lamination, so that the present disclosure exhibits a sufficient function.

The embodiments of the present disclosure described in the present specification and the configurations illustrated in the drawings relate to the preferred embodiments of the present disclosure and are not intended to cover all of the technical ideas of the invention. Therefore, it should be understood that there may be various equivalents and variations that may be substituted at the time of filing. Accordingly, the present disclosure is not limited to the above-described embodiments. It will be apparent to those skilled in the technical field to which the present disclosure pertains that various modifications and variations can be made in the present disclosure without departing from the spirit and scope of the present disclosure as defined in the appended claims, and such changes are within the scope of the claims of the present disclosure.

The invention claimed is:

1. A method of manufacturing a laminated secondary battery having a structure in which a first unit cell (a), a second unit cell (a'), an anode electrode cell (b), and a cathode electrode cell (c) are stacked, the method comprising:

preparing the first unit cell (a) comprised of a separation membrane, a cathode, a separation membrane, an anode, and a separation membrane stacked from bottom to top;

preparing the second unit cell (a') comprised of a separation membrane, an anode, a separation membrane, a cathode, and a separation membrane stacked from bottom to top in the reverse order of the first unit cell (a);

preparing the anode electrode cell (b) formed of an electrochemical device including an anode collector on both sides of which an anode material is coated;

preparing the cathode electrode cell (c) formed of an electrochemical device including a cathode collector on both sides of which a cathode material is coated;

sequentially stacking the first unit cell (a), the cathode electrode cell (c), the second unit cell (a'), the anode electrode cell (b) in the order from bottom to top; and repeating the sequential stacking, wherein an uppermost electrode of the stacked first unit cell (a) has the same polarity as a lowermost electrode of the stacked second unit cell (a'), wherein depending on a number of stacked electrodes, the first electrode cell (b) or the second electrode cell (c) is additionally stacked on the stacked structure, and an uppermost electrode of the stacked structure has the same polarity as a lowermost electrode of the stacked structure, and a separation membrane is disposed on the uppermost electrode of the stacked structure, wherein the completed stacked structure is wrapped with an outer film, and end portions of the outer film are fixed to each other by a tape or a heat fusion.

* * * * *